US007342967B2

(12) United States Patent
Aggarwal et al.

(10) Patent No.: US 7,342,967 B2
(45) Date of Patent: Mar. 11, 2008

(54) SYSTEM AND METHOD FOR ENHANCING PERFORMANCE OF PERSONAL VIDEO RECORDING (PVR) FUNCTIONS ON HITS DIGITAL VIDEO STREAMS

(75) Inventors: Gaurav Aggarwal, Bangalore (IN); Arun Gopalakrishna Rao, Bangalore (IN); Marcus Kellerman, Aliso Viejo, CA (US); David Erickson, Estival, SC (US); Jason Demas, Irvine, CA (US); Sandeep Bhatia, Bangalore (IN); Girish Hulmani, Bangalore (IN)

(73) Assignee: Broadcom Corporation, Irvine, CA (US)

( * ) Notice: Subject to any disclaimer, the term of this patent is extended or adjusted under 35 U.S.C. 154(b) by 775 days.

(21) Appl. No.: 10/317,642

(22) Filed: Dec. 11, 2002

(65) Prior Publication Data

US 2003/0121044 A1 Jun. 26, 2003

Related U.S. Application Data

(63) Continuation-in-part of application No. 09/951,693, filed on Sep. 12, 2001.

(51) Int. Cl.
*H04N 7/12* (2006.01)
*H04N 11/02* (2006.01)
*H04N 11/04* (2006.01)
*H04B 1/66* (2006.01)

(52) U.S. Cl. ............................................. 375/240.25
(58) Field of Classification Search ................. None
See application file for complete search history.

(56) References Cited

U.S. PATENT DOCUMENTS

| | | | | | |
|---|---|---|---|---|---|
| 5,959,659 | A | * | 9/1999 | Dokic | 725/152 |
| 6,157,673 | A | * | 12/2000 | Cuccia | 375/240 |
| 6,463,059 | B1 | * | 10/2002 | Movshovich et al. | 370/389 |
| 6,700,933 | B1 | * | 3/2004 | Wu et al. | 375/240.16 |
| 6,804,301 | B2 | * | 10/2004 | Wu et al. | 375/240.12 |
| 6,940,904 | B2 | * | 9/2005 | Chen et al. | 375/240.12 |
| 2001/0026677 | A1 | * | 10/2001 | Chen et al. | 386/68 |

* cited by examiner

*Primary Examiner*—Nhon Diep
(74) *Attorney, Agent, or Firm*—McAndrews Held & Malloy Ltd.

(57) ABSTRACT

A system, method, and apparatus for reducing the video decoder processing requirements for rewinding a HITS stream are presented herein. During rewind of a HITS stream, the video decoder builds a clean reference picture. The clean reference picture is built by decoding each of the P-pictures in the EP-EP segment. However, because the P-pictures are not displayed, the decoder does not decode the portion of the P-picture below the last intracoded slice. The decoder can build the clean reference picture without decoding the portions of the P-pictures below the last intracoded slice because the subsequent pictures do not use the said portions for prediction.

5 Claims, 5 Drawing Sheets

_US 7,342,967 B2_

SYSTEM AND METHOD FOR ENHANCING PERFORMANCE OF PERSONAL VIDEO RECORDING (PVR) FUNCTIONS ON HITS DIGITAL VIDEO STREAMS

RELATED APPLICATIONS

This application is a continuation-in-part of U.S. application Ser. No. 09/951,693, filed Sep. 12, 2001 and entitled "COMMAND PACKETS FOR PERSONAL VIDEO RECORDER" by Demas et. Al., which is incorporated by reference herein.

FEDERALLY SPONSORED RESEARCH OR DEVELOPMENT

Not Applicable

MICROFICHE/COPYRIGHT REFERENCE

Not Applicable

BACKGROUND OF THE INVENTION

The present invention relates to video recorder and playback systems, and more particularly to controlling the presentation of content.

Television (TV) content distribution is quickly migrating from analog formats to compressed digital formats. Currently, distribution of digital video content for TV display is dominated by use of the MPEG-2 video compression standard (ISO/IEC 13818-2). MPEG-2 and its predecessor MPEG-1 define the standards to compress video content using a combination of various techniques. An MPEG-encoded stream may have three types of pictures, Intra-coded (I), Predicted (P) and Bi-directionally predicted (B). I-pictures are not compressed using any temporal predictions and can be decoded without the need of any other picture. The P-pictures perform temporal predictions from a picture that comes before it in the display order. Thus, decode of a P-pictures requires one picture (from the past) to be available with the decoder for performing temporal predictions. This prediction picture may be either an I-picture or another P-picture. The B-pictures are bi-directionally predicted and, hence, use two pictures for prediction, one from the past and another from the future (in display order).

During normal decode of MPEG streams, video decoders store the last two decompressed I/P pictures in memory. The last I/P picture is used for predicting an incoming P-picture and the last two I/P pictures are used for predicting an incoming B-picture. During a Rewind operation, the pictures have to be displayed in the reverse order. The video stream is itself fed to the decoder through a system that first recorded the stream on a recordable media such as a hard-disk. A Rewind operation is complex because B-pictures cannot be decoded from the previously decoded pictures in the rewind order. Rather, the last two prediction pictures in the forward decode order are needed by the decoder in order to decode a B-picture.

The foregoing can be accomplished by decoding pictures in the forward picture order starting from the last I-picture before the B-picture in the forward decoding order. The I-picture is used as a reference picture since I-pictures do not require any other picture to be decoded. Further, the intervening pictures between the reference picture and the current picture only need to be decoded but not displayed.

However, a special class of MPEG-2 streams, known as Headend In The Sky (HITS) streams, do not include I-pictures, in order to increase the video compression and reduce the bandwidth required to transmit a video stream. Instead, HITS streams use a progressive refresh mechanism to build reference pictures. The progressive refresh mechanism of HITS mandates that each P-picture have at least one intra-coded slice(s), where a slice is 16 horizontal lines of pictures. Furthermore, the intra-coded slice(s) in a P-picture will be just below the intra-coded slice(s) of the previous P-picture. The top slice is intra-coded for a P-picture following a P-picture with an intra-coded slice at the bottom of the picture. The number of intra-coded slices in a P-picture is called the "refresh-rate" of the stream. The streams also ensure that the slices above the intra-coded slice(s) will predict only from those slices of the previous P-picture. The streams also ensure that the slices above the intra-coded slice(s) will predict only from those slices of the previous P-picture that are above the current intra-coded slices. Thus, the slices are progressively refreshed from top to bottom. This scheme ensures that if a series of pictures is decoded starting from a P-picture whose first-slice is intra-coded, then a "clean" refreshed picture will be built after all slices have been progressively refreshed. The picture whose first-slice is intra-coded is called an Entry Point (EP) picture. Typical values of slice refresh rates are 1 and 3 for a stream with a vertical sized of 480 pixels (30 slices, each of 16-lines). Thus, a clean picture may be built by decoding 30 P-pictures when the refresh rate is 1, and 10 P-pictures when the refresh rate is 3.

To perform a Rewind operation on a HITS stream, a video decoder first builds a clean reference using the progressive refresh mechanism, and decodes the intervening pictures between the clean reference and the current picture in the rewind sequence.

The performance of existing video decoders is poor during rewind for HITS streams for several reasons. For a set of pictures between two EP-pictures, the performance is the worst for the last picture since the last picture is displayed first. To display the first picture, a reference picture has to be built and the remaining pictures in the set need to be decoded. Additionally, the number of EP pictures in the HITS stream is fewer as compared to the number of I-pictures in a typical MPEG stream. Therefore, a decoder decodes more pictures to get to the last few pictures of the set. As an example, if the refresh rate of the stream is 1, then 30 pictures need to be decoded to build the clean reference picture. Another 30 pictures need to be decoded to display the last picture in the following EP-EP segment, resulting in a total of 60 pictures that need to be decoded.

If the decoder is not fast enough to be able to decode multiple pictures in a given picture-display timeframe, the visual quality suffers since the decoder will lag behind the display process.

Further limitations and disadvantages of conventional and traditional systems will become apparent to one of skill in the art through comparison of such systems with the invention as set forth in the remainder of the present application with reference to the drawings.

BRIEF SUMMARY OF THE INVENTION

A system and method for enhancing performance of personal video recording (PVR) functions on HITS digital video streams is presented herein. During rewind of a HITS stream, the video decoder builds a clean reference picture. The clean reference picture is built by decoding each of the P-pictures in the EP-EP segment. However, because the P-pictures are not displayed, the decoder does not decode the portion of the P-picture below the last intracoded slice. The decoder can build the clean reference picture without decoding the portions of the P-pictures below the last intracoded slice because the subsequent pictures do not use the said portions for prediction.

Omitting decoding the portion of the P-pictures below the intracoded slice advantageously reduces the processing required to build a clean reference picture.

These and other advantages and novel features of the present invention, as well as illustrated embodiments thereof will be more fully understood from the following description and drawings.

BRIEF DESCRIPTION OF SEVERAL VIEWS OF THE DRAWINGS

A better understanding of the invention can be obtained when the following detailed description of various exemplary embodiments is considered in conjunction with the following drawings.

DETAILED DESCRIPTION OF THE INVENTION

Figure 1:
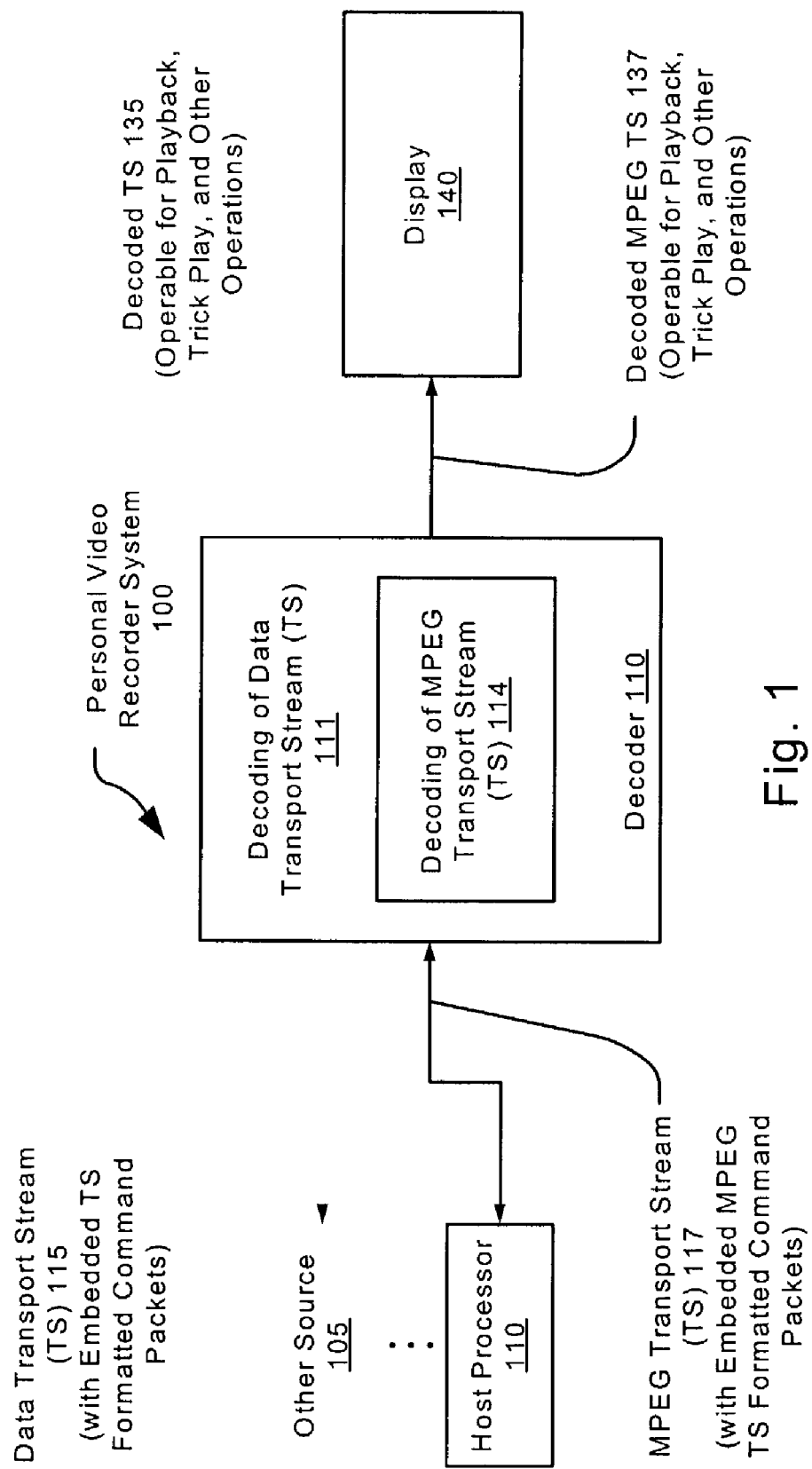
FIG. 1 is a system diagram illustrating an embodiment of a personal video recorder system in accordance with certain aspects of the present invention.

FIG. 1 is a system diagram illustrating an embodiment of a personal video recorder system 100 that is built in accordance with certain aspects of the present invention. The personal video recorder system 100 includes a decoder 120 that receives a data transport stream (TS) 115 from some source. The TS 115 may be received by the decoder 120 from a host processor 110, or any other source 105 without departing from the scope and spirit of the invention. The host processor 110 or the any other source 105 is the device controlling the playback (including trick play playback) of the data. The host processor 110 or the any other source 105 and the decoder 120 may be included within a single device or separate devices.

The decoder 120 is operable to perform decoding of the TS 115, as shown in a functional block 122 within the decoder 120. Similarly, the decoder 120 is operable to perform decoding of the MPEG TS 117, as shown in a functional block 124 within the decoder 120. The now decoded TS 135, is passed to an output device shown as a display 140. Again, other output devices may be employed to accommodate various data types, including audio data types. The use of a display 140 is used to show the exemplary situation of video data TSs. The display 140 is operable to perform playback of the now decoded TS 135. The decoded TS 135 may be of various data types, including audio and video data types.

The decoded TS 135 is now operable for playback, trick play, and other operations within the output device. In one particular situation, the decoded TS may be a decoded MPEG TS 137 that is operable for playback, trick play, and other operations.

Figure 2:
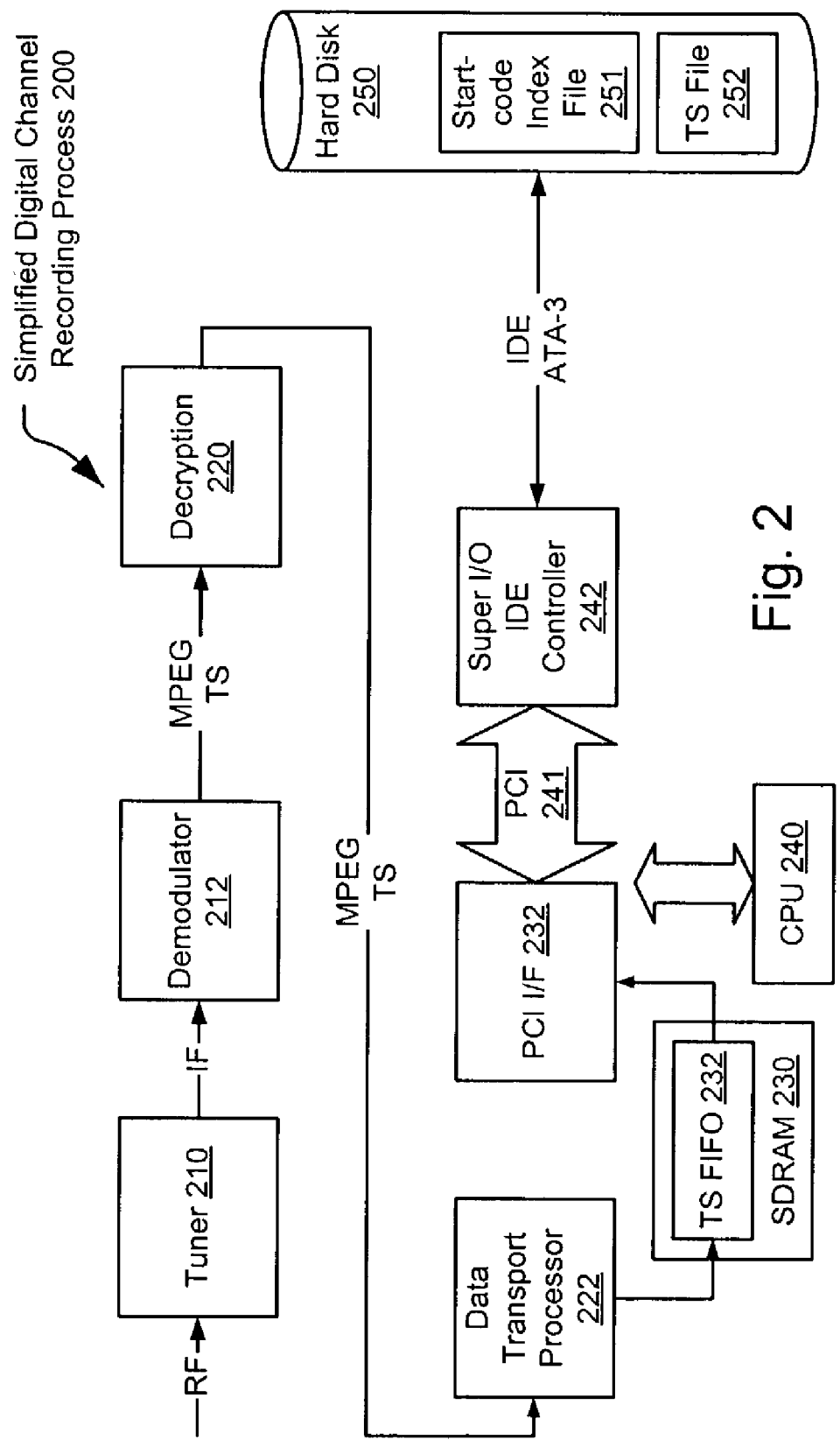
FIG. 2 is a system diagram illustrating an embodiment of a recording process.

FIG. 2 is a system diagram illustrating an embodiment of a simplified digital channel recording process 200 that is performed in accordance with certain aspects of the present invention. The FIG. 2 shows one embodiment where digital channel recording may be performed, in a simplified manner when compared to previous systems, using certain aspects of the present invention. The recording process of digital video stream is given in the FIG. 1. In this embodiment, a personal video recorder (PVR) digital-channel-recording process can be described as shown below.

The selected video service will be contained in a transport stream (TS) that is received as shown in a radio frequency (RF) signal that is received by a tuner 210. The tuner 210 is operable to down-convert the channel that contains the transport stream, from RF to intermediate frequency (IF). The Demodulation block, shown as a demodulator 215, demodulates the IF to base-band digital data and outputs the transport stream (shown as an MPEG TS) and sends the data to the decryption block 220.

The decryption block 220 decrypt the packets of the TS into clear data if the service is authorized. This output TS stream goes to the Data Transport Processor 225. The Data Transport Processor selects the requested service and then re-multiplexes it into a new TS and stores the new TS data in a TS FIFO buffer 232 in synchronous dynamic random access memory (SDRAM) 230.

This new TS is then transferred to a hard disk 250. The data within the TS FIFO buffer 232 is operable to be communicates to the hard disk 250. The CPU 240 controls the storing of the data from the TS FIFO 232 to the hard drive (hard disk 250). This is done using DMA engines sending the data over the PCI bus 241 to the super I/O controller chip 245 containing the IDE interface to the hard drive (hard disk 250) itself. If desired, the IDE ATA-3 Advanced Technology Attachment Interface with Extensions—AT Attachment 3 Interface protocol is employed between the super I/O controller chip 245 and the hard disk 250. A Start Code Index Table (SCIT) 251 is also generated and stored in the hard disk 250 (see the next section for detailed description). A TS file 252 is then stored within the hard disk 252.

The embodiment of the present invention shown in the FIG. 2 shows how a TS may be generated and stored in a hard disk 250.

Figure 3:
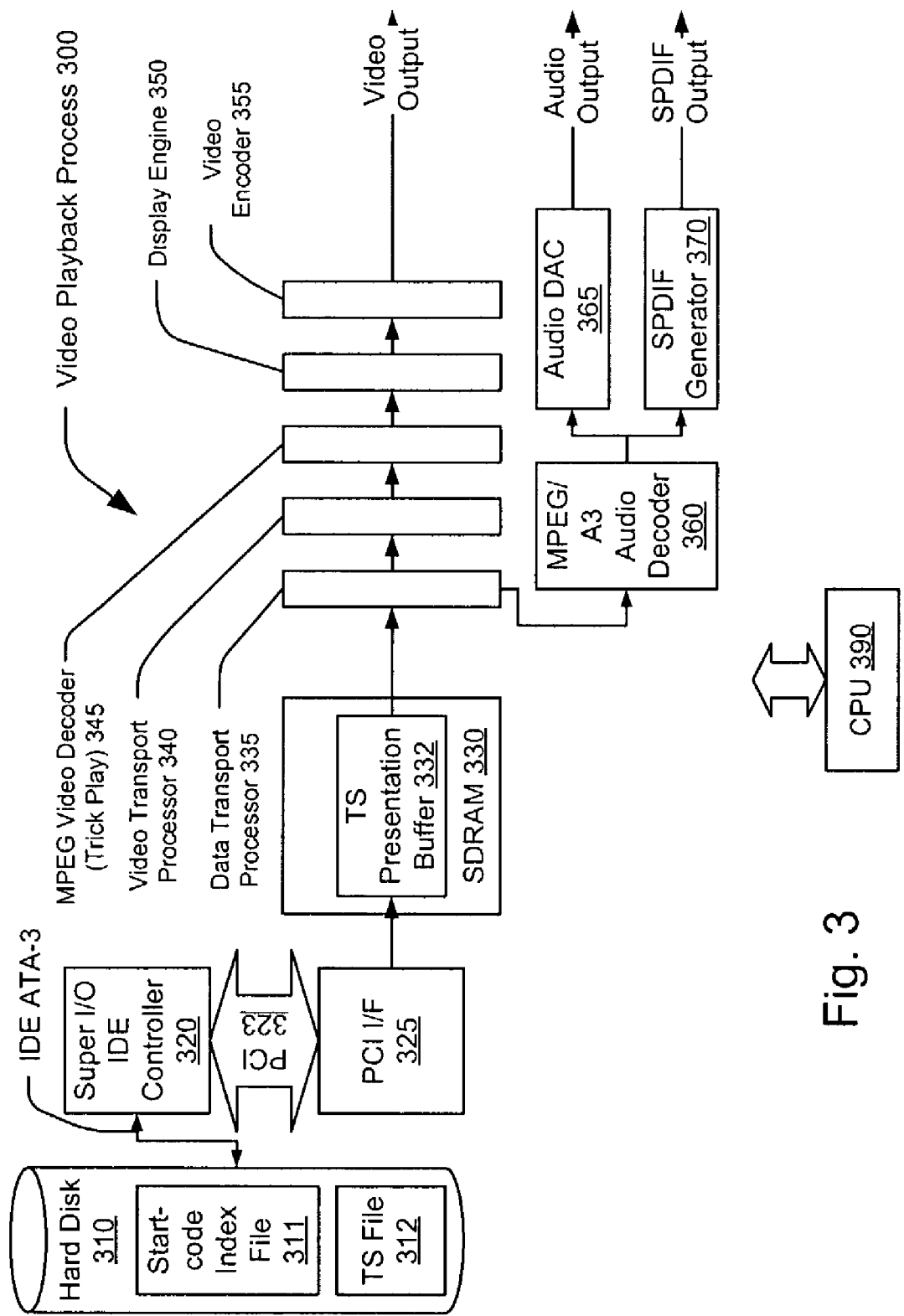
FIG. 3 is a system diagram illustrating an embodiment of a video playback process.

FIG. 3 is a system diagram illustrating an embodiment of a video playback process 300 that is performed in accordance with certain aspects of the present invention. The particular example of video data retrieval and playback is shown in the FIG. 3, but these aspects of the present invention are also extendible to retrieval and playback of other types of data, including audio data and other digital data types.

For a program recorded on the hard drive/hard disk 310, a personal video recorder, or other operable system, can play back that program using that which is described below in the system diagram of the FIG. 3. A processor, that may include a CPU 390, reads the TS data (shown as the TS file 312) from the hard drive/hard disk 310 based on the user selected playback mode. The correct TS data (from the TS file 312 within the hard drive/hard disk 310) is read into TS presentation buffer 332 within a SDRAM 330 using DMA engines.

Data may be read from the hard drive/hard disk 310 in a manner similar to the manner in which data is written into the hard drive/hard disk 310, a super I/O controller chip 320 may communicatively couple with the hard disk 310 and perform data transfer using the IDE ATA-3 protocol. The super I/O controller chip 320 then communicatively couples to the TS presentation buffer 332 within the SDRAM 330 via a PCI bus 323 and a PCI I/F 325. The data is output from the TS presentation buffer 332 and is then passed to a data transport processor 335. The data transport processor then de-multiplexes the TS into its PES constituents and passes the audio TS to an audio decoder 360 and the video TS to a video transport processor 340, and then to a MPEG video decoder 345 that is operable to decode and extract embedded, TS formatted command packets, that may include instructions to perform trick play functionality. The audio data is then sent to the output blocks, and the video is sent to a display engine 350. The display engine 350 is responsible for and operable to perform scaling the video picture, rendering the graphics, and constructing the complete display among other functions. Once the display is ready to be presented, it is passed to a video encoder 355 where it is converted to analog video using an internal digital to analog converter (DAC). The digital audio is converted to analog in the audio digital to analog converter (DAC) 365 while a Sony Philips Digital Inter-Face (SPDIF) output stream is also generated and transmitted.

The video TS comprises pictures that are compressed representations of individual images forming a video. The video decoder 345 decompresses the pictures, thereby recovering the individual images forming the video. Compression is achieved by taking advantage of both spatial and temporal redundancy in the image fonning the video. Compression using temporal redundancy takes advantage of redundancies between video images recorded in substantially the same time period. Redundant features among the images are recorded in one picture referenced by other pictures. As a result, some pictures are data dependent on other pictures.

Figure 4:
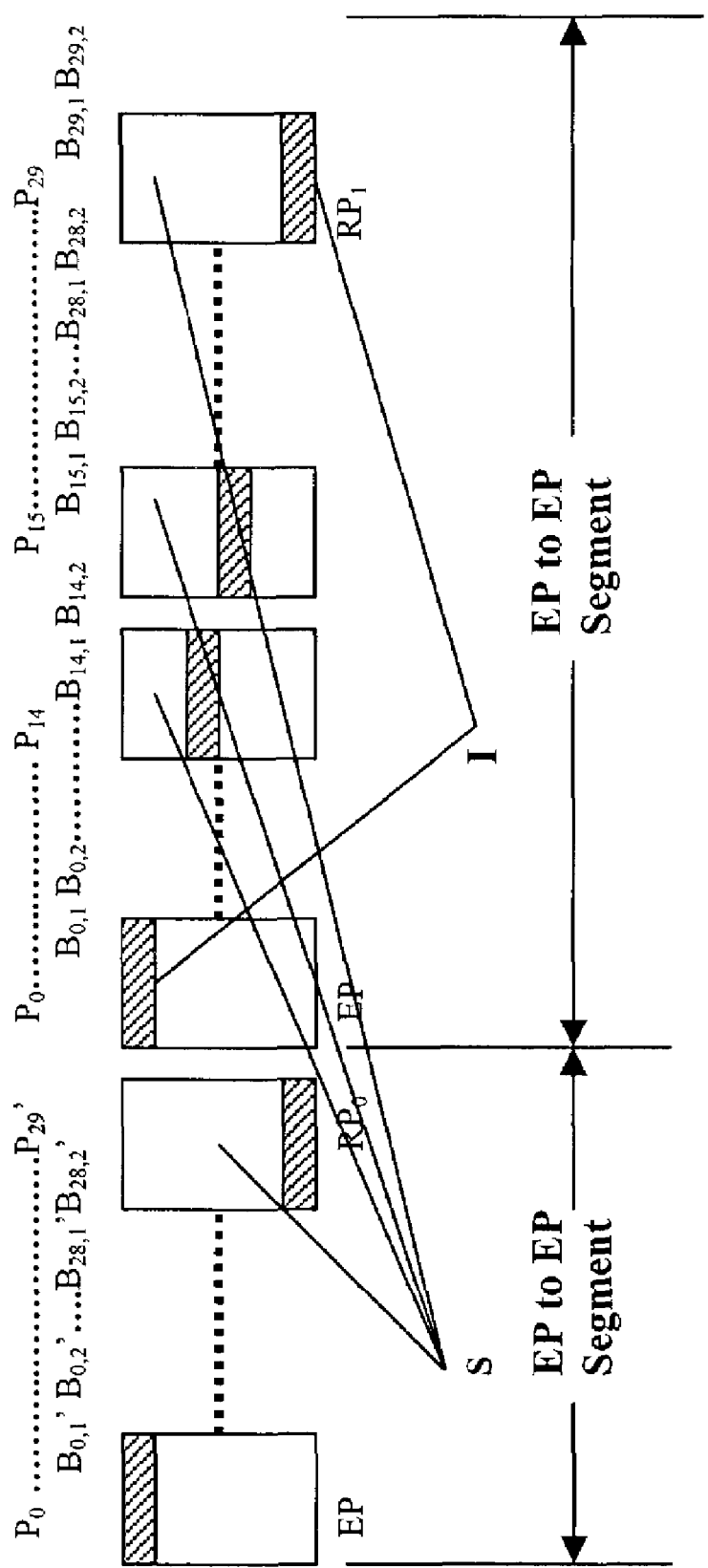
FIG. 4 is a block diagram describing an exemplary HITS stream.

Referring now to FIG. 4, there is illustrated a block diagram describing an exemplary HITS stream. A HITS stream is a special class of MPEG-2 streams which includes P-pictures, P, and B-pictures, B, but do not include I-pictures. There are usually a uniform number of B-pictures, for example $B_{01}$ and $B_{02}$, between each of the P-pictures. HITS streams do not include I-pictures because I-pictures require the most memory and bandwidth. Instead, HITS streams use a progressive refresh mechanism to build reference pictures. In the progressive refresh mechanism, each P-picture, P, have at least one intra-coded slice(s), I, where a slice comprises 16 horizontal lines of pixels. Furthermore, the intra-coded slice(s) in a P-picture, e.g., $P_{15}$ will be just below the intra-coded slice(s) of the previous P-picture, e.g., $P_{14}$ The top slice, I, is intracoded for a P-picture, $P_0$ following a P-picture, P with an intracoded slice, I, at the bottom of the picture, $RP_1$. Additionally, the streams also ensure that the slices above the intra-coded slices, S, predict only from those slices of the previous P-picture that are above the current intracoded slice(s), I. The foregoing ensures that if a series of pictures is decoded starting from a P-picture whose first-slice is intra-coded, then a "clean" refreshed picture will be built after all slices have been progressively refreshed. The P-picture whose first-slice is intra-coded is called an Entry Point (EP) picture, EP. The P-picture immediately before the EP picture, EP, i.e., the P-picture with the I-slice(s), I, at the bottom of the picture, RP, will be referred to as a clean reference picture.

The rewind operation on a HITS stream, starting from arbitrarily chosen picture, $B_{29,2}$, can be achieved by building the clean reference picture, $RP_1$, immediately preceding the arbitrarily chosen picture $B_{29,2}$, and decoding each intervening P-picture in the forward decode order before the chosen picture, $B_{29,2}$. Building the clean reference picture $RP_1$ requires decoding each P-pictures in the EP to EP segment comprising $RP_0$, e.g., $P_0' \ldots P_{28}'$. While decoding the intervening P-pictures, the last two P-pictures are stored in memory. Upon decoding the last two P-pictures, $P_{28}$, $P_{29}$ before the chosen picture, $B_{28,2}$, the decoder can then decode the chosen picture. The foregoing is repeated for each picture in the rewind sequence. The decoded pictures for various pictures in the rewind sequence for the HITS stream illustrated in FIG. 4 are shown in the table below.

| Picture Displayed | Pictures Decoded |
| --- | --- |
| $B_{29,2}$ | $P_0' \ldots P_{29}', P_0 \ldots P_{29}$ |
| $B_{29,1}$ | $P_0' \ldots P_{29}', P_0 \ldots P_{29}$ |
| $P_{29}$ | $P_0' \ldots P_{29}', P_0 \ldots P_{28}$ |
| $B_{28,2}$ | $P_0' \ldots P_{29}', P_0 \ldots P_{28}$ |
| $B_{28,1}$ | $P_0' \ldots P_{29}', P_0 \ldots P_{28}$ |
| $P_{28}$ | $P_0' \ldots P_{29}', P_0 \ldots P_{27}$ |
| $B_{27,2}$ | $P_0' \ldots P_{29}', P_0 \ldots P_{27}$ |
| $B_{27,1}$ | $P_0' \ldots P_{29}', P_0 \ldots P_{77}$ |
| . | |
| . | |
| . | |
| $B_{02}$ | $P_0' \ldots P_{29}', P_0$ |
| $B_{01}$ | $P_0' \ldots P_{29}', P_0$ |
| $P_0$ | $P_0' \ldots P_{29}'$ |

As can be seen, pictures $P_0' \ldots P_{29}'$ are decoded for displaying every picture from $P_0$ to $B_{29,2}$. Each of the pictures $P_0$ to $B_{29,2}$ can be decoded by starting from the clean reference picture $RP_0$. However, the clean reference picture $RP_0$ is data dependent on the pictures $P_0' \ldots P_{28}'$. Accordingly, pictures $P_0' \ldots P_{28}'$ are decoded in order to decode the clean reference picture $RP_0$.

Because the pictures $P_0' \ldots P_{28}'$ are decoded for the purpose of building the clean reference picture $RP_0$, the decoder does not need to decode the portion of the P-picture below the last intracoded slice. The decoder can build the clean reference picture $RP_0$ without decoding the portions of the P-pictures $P_0' \ldots P_{28}'$ which are below the last intracoded slice I, because subsequent pictures do not use the said portions for prediction.

Accordingly, aspects of the present invention involve decoding the slices, S, of the HITS stream P-pictures, e.g., $P_0' \ldots P_{28}'$ which are above the last intracoded slice I in the picture. If the slices, S, I of the P-pictures, $P_0' \ldots P_{28}'$, are decoded in raster order, the video decoder 345 decodes each slice of the P-picture, $P_0' \ldots P_{28}'$, until the last intracoded slice, I is decoded. Responsive to decoding the last intracoded slice, the video decoder 345 decodes the next P-picture in the forward decode order.

Figure 5:
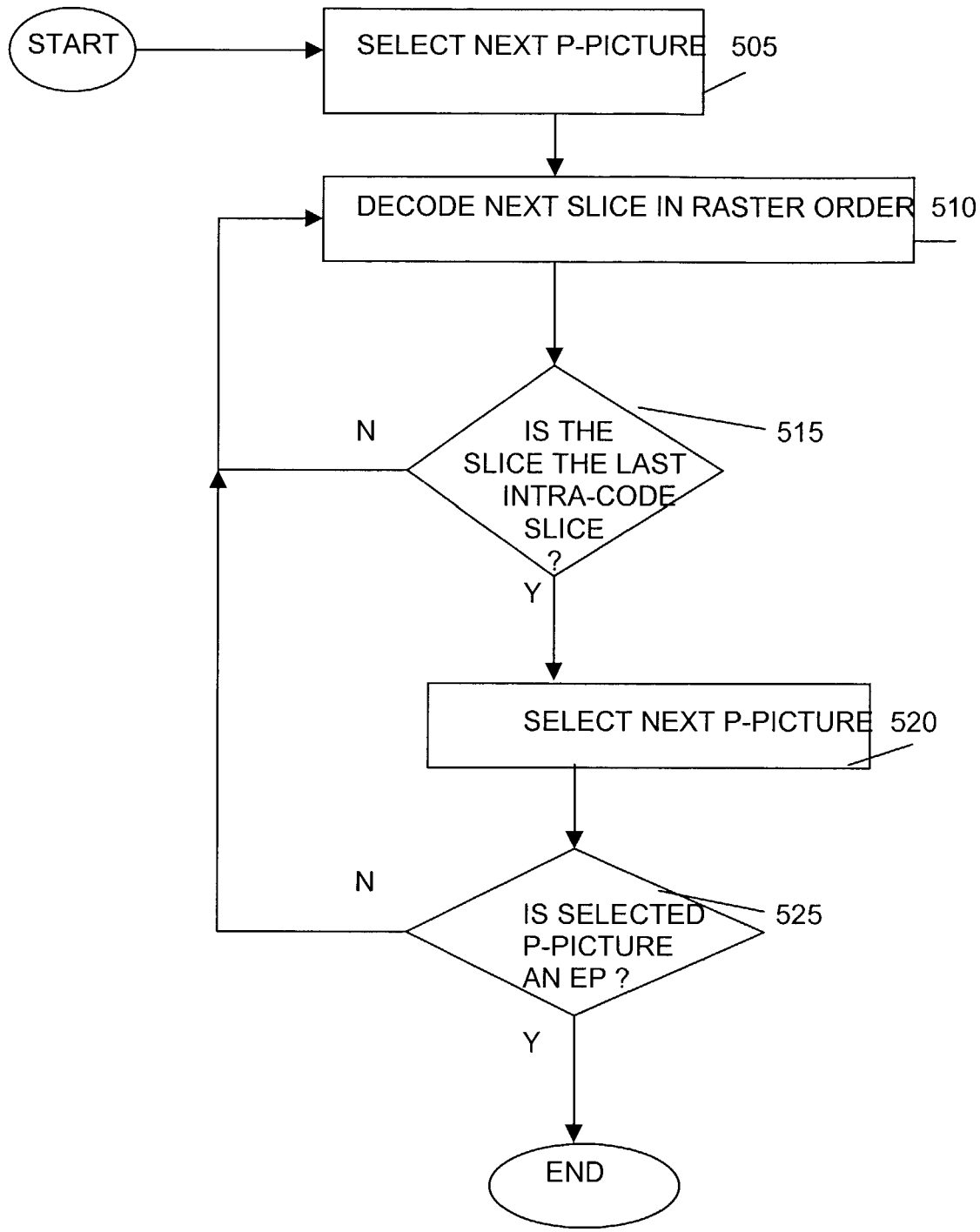
FIG. 5 is a flow diagram describing the operation of the video decoder in accordance with an embodiment of the present invention.

Referring now to FIG. 5, there is illustrated a block diagram describing building a clean reference picture, e.g., $RP_0$ in accordance with an embodiment of the invention. At 505, the next P-picture in the forward decode order of the EP-EP segment comprising the clean reference picture $RP_0$ to be built is selected. Initially, the first P-picture, e.g., $P_0'$ is selected.

At 510, the video decoder 345 begins decoding the next slice S in raster scan order of the P-picture selected in 505. Initially, the video decoder 345 begins decoding the top slice S. After decoding the slice, S, the video decoder 345 determines (515) whether the slice, S, decoded during 510 is the last intracoded slice of the picture, P. If the slice, S, decoded during 510 is not the last intracoded slice of the picture, P, the video decoder 345 repeats 510 for the next slice, S, in raster order.

If the slice decoded in 510 is the last intracode slice of the P-picture, the video decoder 345 selects 520 the next P-picture in the forward decode order. At 525, the video decoder 345 determines whether the picture selected during 520 is an EP picture, e.g., $P_0$. If the picture selected during 520 is an EP picture, the clean reference picture is completed and the process is terminated. If the picture selected during 520 is not an EP picture, 510-515 are repeated for the picture selected during 520.

For a refresh rate of 1, the number of slices decoded using partial decoding approaches 50% of the slices decoded using full decoding, as the number of P-pictures between EPs are increased.

Additional decoder bandwidth and processing is also saved in the fast forward operation. In an exemplary fast forward scheme, a first HITS fast-forward speed skips some B-pictures, a second speed skips all B-pictures, and reference frames are only build for a third speed.

The personal video recorder system 100 as described herein may be implemented as a board level product, as a single chip, application specific integrated circuit (ASIC), or with varying levels of the system integrated on a single chip with other portions of the system as separate components. The degree of integration of the monitoring system may be determined by speed of incoming MPEG packets, and cost considerations. Because of the sophisticated nature of modern processors, it is possible to utilize a commercially available processor, which may be implemented external to an ASIC implementation of the present system. Alternatively, if the processor is available as an ASIC core or logic block then, the commercially available processor can be implemented as part of an ASIC device wherein the memory storing instructions is implemented as firmware.

In one embodiment, aspects of the present invention can be implemented by insertion of command packets within the MPEG TS with appropriate TS formatted trick play commands by a host processor, such as host processor described in "Command Packets for Personal Video Recorders", application Ser. No. 09/951,693, by Kellerman, et. al, which is incorporated herein by reference.

While the invention has been described with reference to certain embodiments, it will be understood by those skilled in the art that various changes may be made and equivalents may be substituted without departing from the scope of the invention. In addition, many modifications may be made to adapt particular situation or material to the teachings of the invention without departing from its scope. Therefore, it is intended that the invention not be limited to the particular embodiment(s) disclosed, but that the invention will include all embodiments falling within the scope of the appended claims.

The invention claimed is:

1. A system for displaying pictures, said system comprising:
   a host processor for transmitting transport packets, said transport packets providing a plurality of instructions;
   a video decoder for executing the plurality of instructions; and
   wherein execution of the instructions by the video decoder comprises causing:
      selecting a picture, said picture comprising an intracoded slice and at least one slice above the intracoded slice, and at least one slice below the intracoded slice;
      decoding the at least one slice above the intracoded slice;
      decoding the intracoded slice; and
      decoding at least a portion of another picture after decoding the at least one slice above the intracode slice and the intracode slice without having decoding the at least one slice below the intracoded slice.

2. The system of claim 1, wherein the another picture comprises an intracoded slice and at least one slice above the intracoded slice, and wherein decoding at least a portion of the another picture further comprises:
   decoding the at least one slice above the intracoded slice in the second picture; and
   decoding the intracoded slice of the second picture.

3. The system of claim 2, wherein causing decoding the at least one slice above the intracoded slice in the another picture comprises causing:
   predicting the slices above the intracoded slice in the another picture from the intracoded slice and the slices above the intracoded slice in the picture.

4. The system of claim 1, wherein decoding the at least one slice above the intracoded slice further comprises causing:
   decoding the at least one slice in raster order.

5. The system of claim 1, wherein the picture comprises a P-picture from a HITS stream.

* * * * *